United States Patent [19]
Tsukamoto et al.

[11] Patent Number: 6,098,005
[45] Date of Patent: Aug. 1, 2000

[54] VEHICLE TRANSMISSION CONTROLLER FOR CHANGING GEAR RATIOS IN ACCORDANCE WITH ROAD FEATURES

[75] Inventors: Kazumasa Tsukamoto, Anjo; Masao Kawai; Hideki Aruga, both of Tokyo-to, all of Japan

[73] Assignees: Aisin AW Co., Ltd.; Kabushiki Kaisha Equos Research, both of Japan

[21] Appl. No.: 08/923,639

[22] Filed: Sep. 4, 1997

[30] Foreign Application Priority Data

Sep. 4, 1996 [JP] Japan ................................. 8-255436

[51] Int. Cl.[7] .................................................. F16H 59/66
[52] U.S. Cl. ................................. 701/65; 701/55; 477/97
[58] Field of Search .................. 701/55, 56, 58, 701/65, 59, 208; 477/97, 34

[56] References Cited

U.S. PATENT DOCUMENTS 5,716,301  2/1998  Wild et al. .................................. 477/97
5,832,400  11/1998  Takahashi et al. ......................... 701/53
5,893,894  4/1999  Moroto et al. ............................. 701/53

FOREIGN PATENT DOCUMENTS 0 745 788 A1  12/1996  European Pat. Off. .
0 752 548 A2  1/1997  European Pat. Off. .
61-134269  10/1986  Japan .

*Primary Examiner*—Michael J. Zanelli
*Attorney, Agent, or Firm*—Lorusso & Loud

[57] ABSTRACT

There is provided control over transmission stages which suppresses unnecessary shifts to a higher speed based on road information stored in a navigation system to allow smooth acceleration. An intersection ahead of the vehicle in the traveling direction is detected based on the road information stored in the navigation system and, when the vehicle is decelerated as it approaches the intersection, an optimum transmission stage for acceleration is selected in advance in accordance with the speed of the vehicle by predicting the acceleration to be performed when exiting the intersection. This eliminates the need for a shift to a lower speed before effecting acceleration by pressing the accelerator and thereby ensures smooth acceleration.

8 Claims, 7 Drawing Sheets

VEHICLE TRANSMISSION CONTROLLER FOR CHANGING GEAR RATIOS IN ACCORDANCE WITH ROAD FEATURES

BACKGROUND OF THE INVENTION

1. Field of the Invention

The present invention relates to vehicle transmission controllers and, more particularly, to control of transmission gear ratios of automatic transmissions including stage transmissions and non-stage transmissions.

2. Description of the Related Art

A controller for an automatic transmission has been proposed which includes a changing means for changing control patterns for an automatic transmission in accordance with different driving conditions encountered in travel (Japanese examined patent publication No. H6-58141).

In travel a vehicle encounters various road features and conditions which dictate extra caution and slower speed, such as intersections, crossings and curves in which acceleration and deceleration are frequent, especially in travelling roads in urban areas. For example, acceleration may be required at a crossing by a green (or blue) traffic light immediately after deceleration in response to a red light. Driving a curve involves change in speed, i.e. entering at a reduced speed and exiting at an increased speed.

Figure 7:
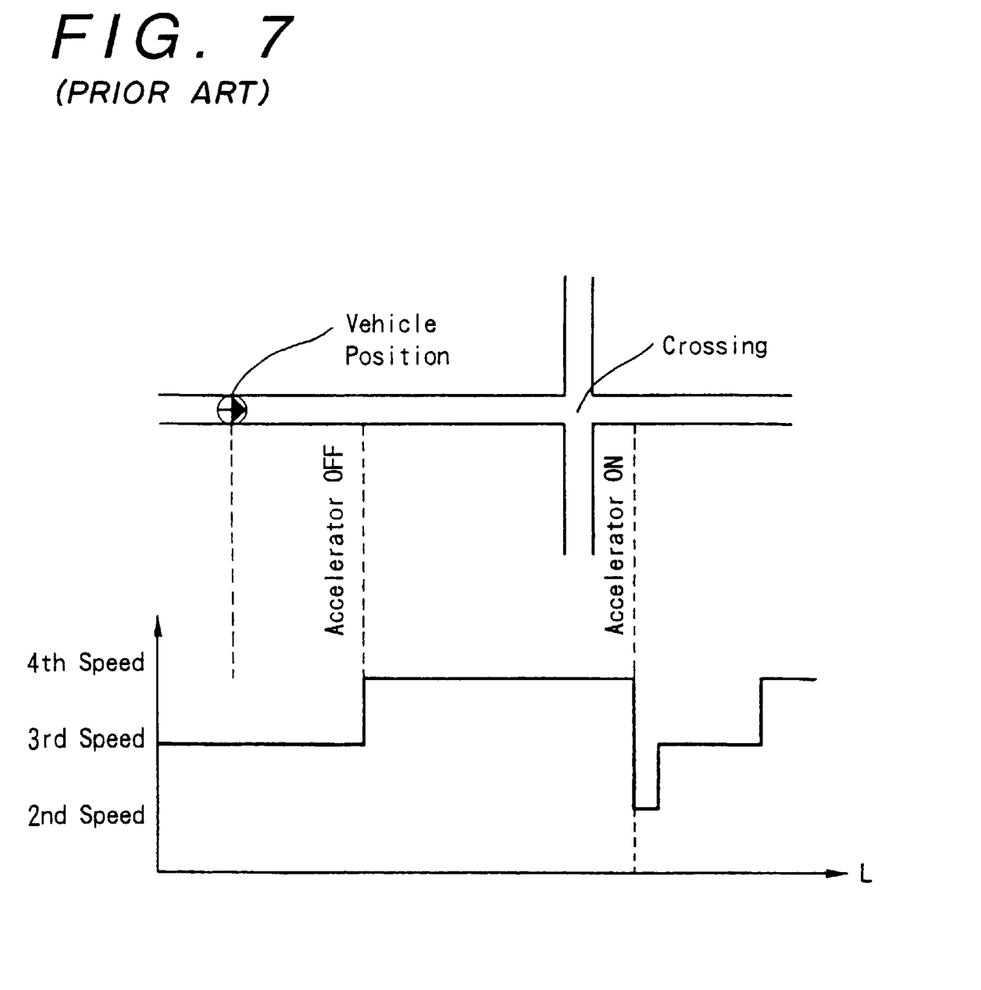
FIG. 7 is a diagram showing the relationship between vehicle position and transmission stages during passage through an intersection under conventional control over the transmission stages.

In cases as described above, as shown in FIG. 7, conventional transmission control produces a shift to a transmission stage for a higher speed when the accelerator is released for deceleration and in a shift to a lower speed when the accelerator is then pressed before acceleration actually takes place. However, there has been a problem in that acceleration can not be achieved as smoothly and responsively as required to satisfy drivers.

The present invention has been made to address the foregoing problems, and has as its object provision of a vehicle transmission controller capable of suppressing unnecessary shifts to higher speeds, under road conditions which dictate a series of acceleration and deceleration operations, and achievement of control over transmission gear ratios providing for smooth and highly responsive acceleration, as intended by the driver.

SUMMARY OF THE INVENTION

To achieve the foregoing objectives the present invention provides a vehicle controller including: road information acquisition means for acquiring road information; vehicle position detecting means for detecting the position of the vehicle on a road; vehicle speed detecting means for detecting the speed of the vehicle; control range setting means for setting an interval in which control is to be performed including at least one feature on the road requiring a change in gear ratio of the transmission; an automatic transmission mechanism for automatically changing the transmission gear ratio; transmission gear ratio regulating means for setting an upper limit for transmission gear ratios in the interval in which control is to be performed based on the vehicle speed; driving operation detecting means for detecting a driving operation of the driver indicative of an intent to change travel speed of the vehicle; and transmission gear ratio setting means for controlling the automatic transmission mechanism during said interval to establish a transmission gear ratio predetermined for the detected vehicle speed, within a range up to said set upper limit, responsive to detection of said driving operation.

The driving operation detected by the driving operation detecting means may be one or more of operation of the accelerator, operation of the foot brake, and turning a blinker (turn signal) ON.

The automatic transmission may be either a multi-stage transmission or a non-stage transmission.

DETAILED DESCRIPTION OF THE PREFERRED EMBODIMENTS

Preferred embodiments of the present invention will now be described with reference to the accompanying drawings.

Figure 1:
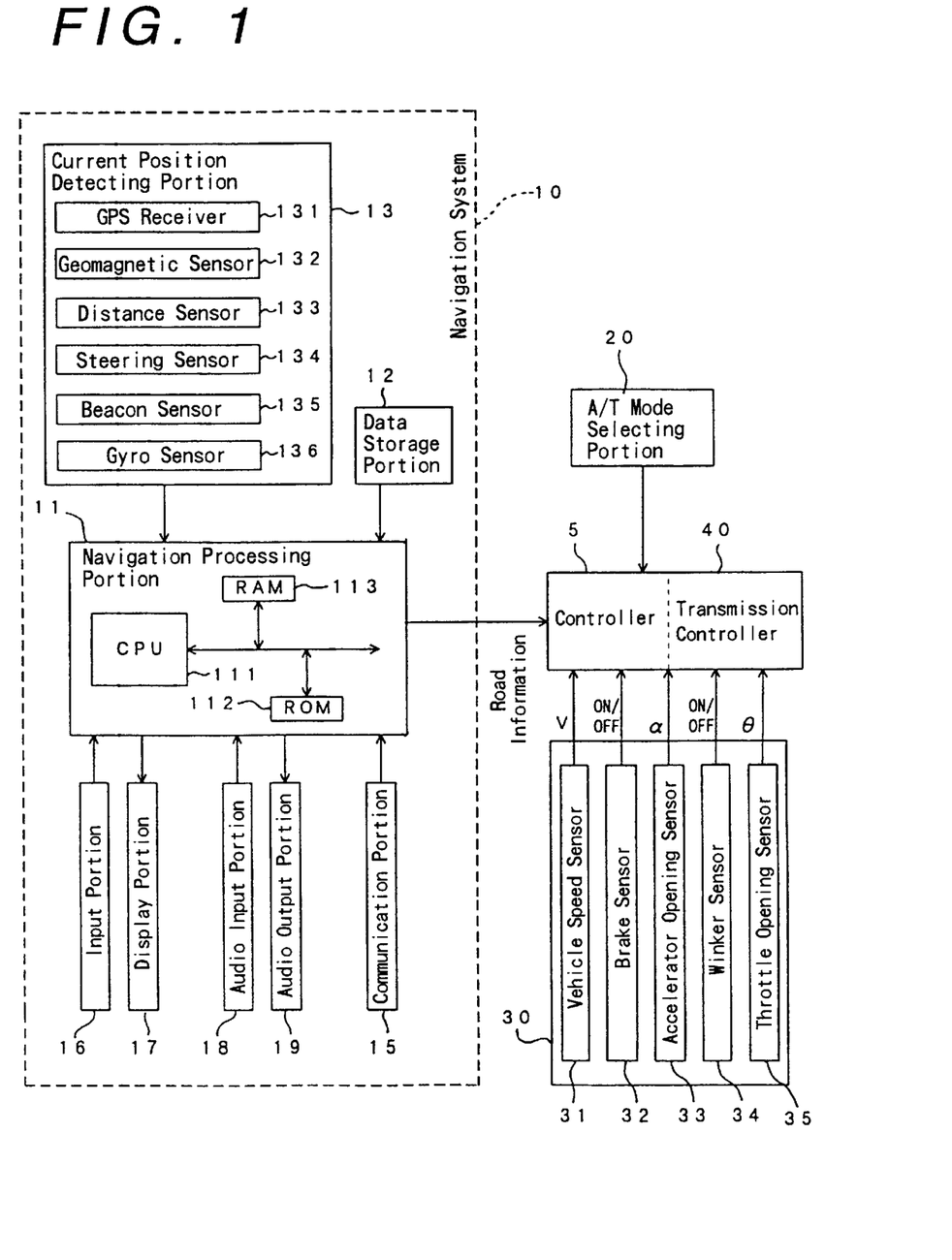
FIG. 1 is a block diagram of an embodiment of a vehicle transmission controller according to the present invention.

FIG. 1 shows a preferred embodiment of a vehicle controller 1 according to the present invention as including a navigation system 10, an A/T mode selecting unit 20, a traveling state detecting unit (sensor unit) 30, a controller 5 and a transmission controller 40.

The navigation system 10 includes a navigation processing section 11, a data storage section 12 which is a means for storing road information, a current position detecting section 13, a communications unit 15, an input section 16, a display unit 17, and an audio output unit 19.

The navigation processing section 11 includes a central processing unit (hereinafter referred to as CPU) 111 for performing various operations such as navigation routines and for outputting the results of the same. A ROM 112 and a RAM 113 are connected to the CPU 111 through bus lines such as data buses. The ROM 112 is a read only memory which stores various programs for purposes such as retrieval of routes to a destination, guidance for traveling the routes, and determination of an interval in which control is to be performed. The RAM 113 is a random access memory which serves as a working memory for the CPU 111 in performing its various operations.

The data storage section or unit 12 includes a map data file, a cross data file, a node data file, a road information file, a photograph data file, and other data files for storing various information on each local feature and area, such as hotels, gas stations and sight-seeing places. These files store various data for searching routes and for displaying guidance views along the route determined by search, e.g. photographs and sketches that characterize intersections and routes. The data files further include data for display of the distance to be traveled before the next intersection and the direction to be taken at the next intersection, and for output of other guidance information through the display unit 17 and the audio output unit 19.

The information stored in the aforementioned data files includes files of intersection data, node data, and road information data which are used for route searching during normal navigation. These files store road attributes such as road widths and gradients, road surface conditions, the radii of curvature of curves, intersections, junctions, number of lanes, points where lanes merge, curve entrances, railroad crossings, ramp ways at the entrances of highways, tollbooths on highways, points where a road width narrows and hills (inclines and declines).

Various storage devices such as floppy disks, hard disks, CD-ROMS, optical disks, magnetic tapes, IC cards, and optical cards are used to store the above-mentioned files. Although devices having a large memory capacity, e.g., CD-ROMs, are preferably used for storage of those files, IC cards may be used for individual data such as additional data files and data for individual local areas. The above-described navigation processing section 11 and the data storage section 12, serving as a road information storage means, constitute a road information acquisition means.

The current position detecting unit 13 includes a GPS receiver 131, a geomagnetic sensor 132, a distance sensor 133, a steering sensor 134, a beacon sensor 135, and a gyro sensor 136. The GPS receiver 131 is a device for receiving signals from artificial satellites from which the position of the vehicle is calculated. The geomagnetic sensor 132 finds the direction in which the vehicle is traveling. The distance sensor 133 may be a measuring device for detecting and counting the number of revolutions of the wheels, or a measuring device for detecting acceleration and for integrating it twice or another type of measuring device. An optical rotation sensor, a rotational resistance volume sensor, or the like may be used as the steering sensor 134. However, it is possible to use an angle sensor which is mounted on a wheel portion. The beacon sensor 135 receives position information from roadside beacons. The gyro sensor 136 is a gas rate gyro, an optical fiber gyro, or the like which detects the rotational angular velocity of the vehicle and finds the direction of the vehicle by integrating the angular velocity.

Each of the GPS receiver 131 and the beacon sensor 135 of the current position detecting section 13 can independently determine position. Alternatively, the absolute position of the vehicle (vehicle position) may be detected by combining distance detected by the distance sensor 133 and direction detected by the geomagnetic sensor 132 and the gyro sensor 136 or by combining distance detected by the distance sensor 133 and steering angle detected by the steering sensor 134.

The communications unit 15 is responsible for transmission and reception of various data to and from an FM transmitter, a telephone network, or the like and receives, for example, various data from an information center or the like, including road information pertaining to, for example, traffic jams and traffic accidents.

The input unit 16 is configured so as to allow correction of the current position and input of a destination at the beginning of a trip. By way of example, the input section 16 may include a touch panel which is disposed on a display screen that constitutes the display section 17 and which allows input of information by touching keys and menus displayed on the screen, by a keyboard, by a mouse, by a bar code reader, by a light-pen, and/or by a remote controller.

The display unit 17 provides various displays for operational guidance, operation menus, operation keys, a route to guidance points set as required by the user, and guidance views along the route being traveled. The display portion 17 may include a CRT display, a liquid crystal display, a plasma display or a hologram device which projects holograms onto the front glass.

The audio input unit 18 is a microphone or the like which allows audio input of necessary information by voice. The audio output portion 19 includes a voice synthesizer and a speaker and outputs audio guidance information synthesized by the voice synthesizer. In addition to or instead of voice messages synthesized by the voice synthesizer, various guidance information messages may be recorded on a tape in advance and output from the speaker.

In such a navigation system 10, a vehicle position detecting means may be the combination of current position detector 13 and a road information acquisition means, here represented by the data storage portion 12. Further, road attribute determination means is the combination of the data storage unit 12, the current position detecting unit 13, and the navigation processing unit 11.

In addition, a control interval setting means is the combination of the current position detecting unit 13, the data storage unit 12, and the navigation processing unit 11.

An interval in which shift control is to be provided for a location ahead of the vehicle is determined by the navigation processing unit 11 based on the current position of the vehicle detected by the current position detecting unit 13 and road information acquired by the road information acquisition means. An interval in which shift control is to be provided is the nearest interval (road section) among intervals in the predetermined route to be traveled which is expected to require deceleration and acceleration of the vehicle speed, performed as a series of operations. For example, an intersection, other crossing or point in a curve may be regarded as a reference point bracketed (spanned) by such an interval.

Figure 6:
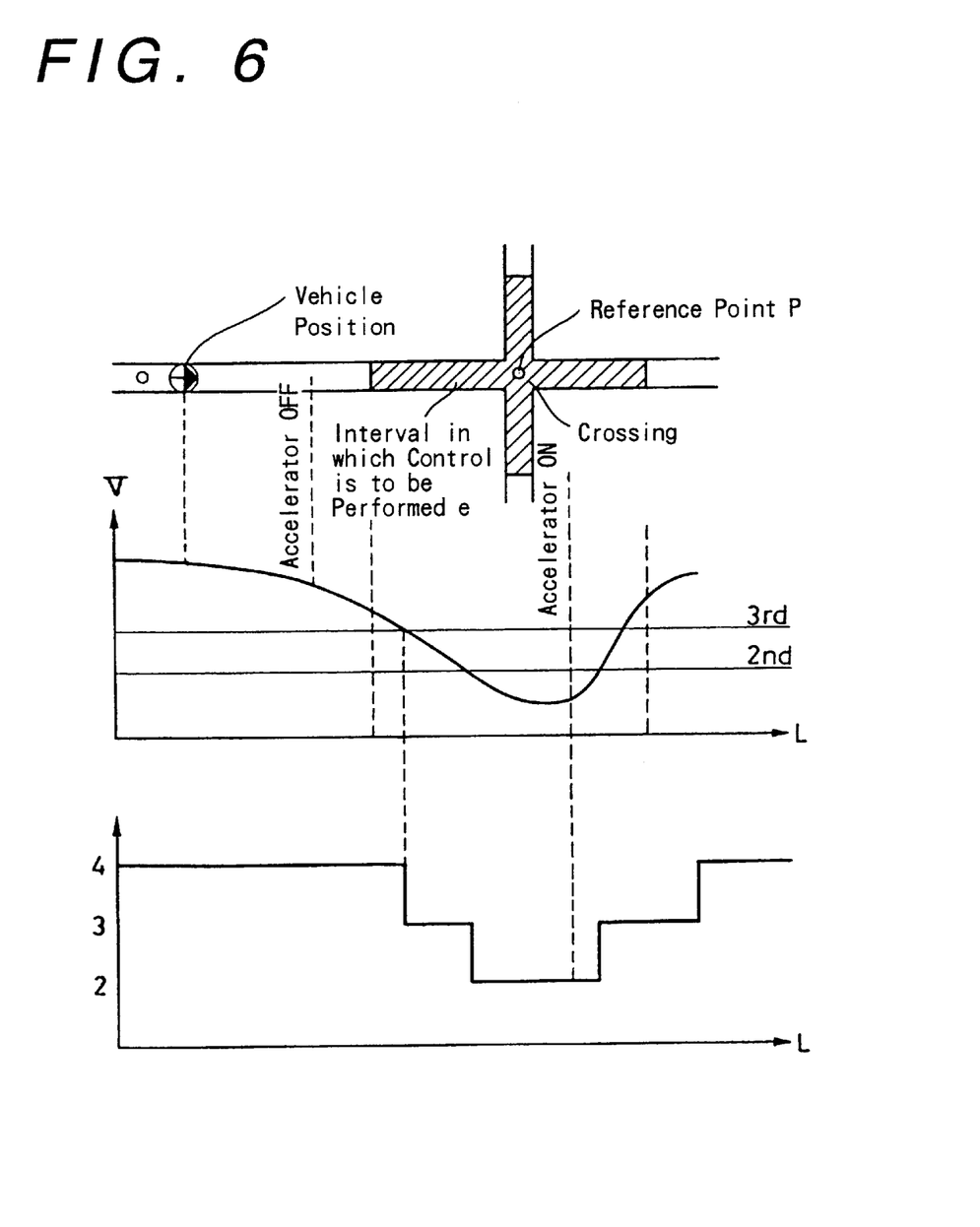
FIG. 6 is a compound graph showing the relationship between vehicle positions and transmission stages during travel through a control interval (stretch of road including, for example, an intersection)

For example, as shown in FIG. 6, a center P of an intersection is identified as a reference point and an interval extending 10 meters before the point P and 20 meters beyond the point P is set as an interval "e" in which shift control is to be performed. In the case of a curve, the deepest point of the curve ("clipping point") may be used as a reference point to set predetermined distances before and behind such a point, thereby determining an interval in which control is to be performed.

"A road to be traveled", as used herein, means either a course predetermined as by a route search, as a guidance route for the vehicle or a route expected to be traveled if, for example, the vehicle travels straight in the case where no route is preset (determined). By providing route search means for determining a road to the destination, a road to be traveled can be more clearly defined to improve controllability.

The A/T mode selector 20 is an operating unit which selects a transmission mode in transmission stage determination to be described later. The sensor unit 30 includes a vehicle speed sensor 31 which serves as a vehicle speed detecting means, a brake sensor 32 which serves as a driving operation detecting means, an accelerator opening sensor 33, a blinker sensor 34, and a throttle opening sensor 35. The vehicle speed sensor 31 detects a vehicle speed V; the brake sensor 32 detects whether the foot brake is ON or OFF; the accelerator sensor 33 detects accelerator opening α; the blinker sensor 34 detects whether a blinker is ON or OFF; and the throttle opening sensor 35 detects throttle opening. In addition, the sensor unit 30 may be used to detect the gear ratio, to detect whether or not cruise control is enabled, to detect whether or not a light is turned ON and to detect whether or not the windshield wipers are operating.

The controller 5 receives the input of a vehicle speed signal, an acceleration opening signal from the acceleration sensor, a throttle opening signal from the throttle sensor, brake ON and OFF signals from the brake sensor, blinker ON and OFF signals from the blinker sensor, and road information from the navigation system 10. Further, the intention of the driver to decelerate is confirmed based on the brake ON and OFF signals and/or the blinker ON and OFF signals.

The controller 5 controls engine output based on the detected vehicle speed V and accelerator opening and the like, controls an engine controller 6, defines an upper limit for the transmission stages (gear ratio) during travel of a road section (interval) for which shift control is to be performed, based on the road information input from the navigation processing unit 11, and outputs a signal regulating shifting between transmission stages to a transmission controller 40 to be described later.

This controller 5 constitutes a transmission stage regulating means which establishes an upper limit for transmission stages defined by the transmission controller 40.

Figure 3:
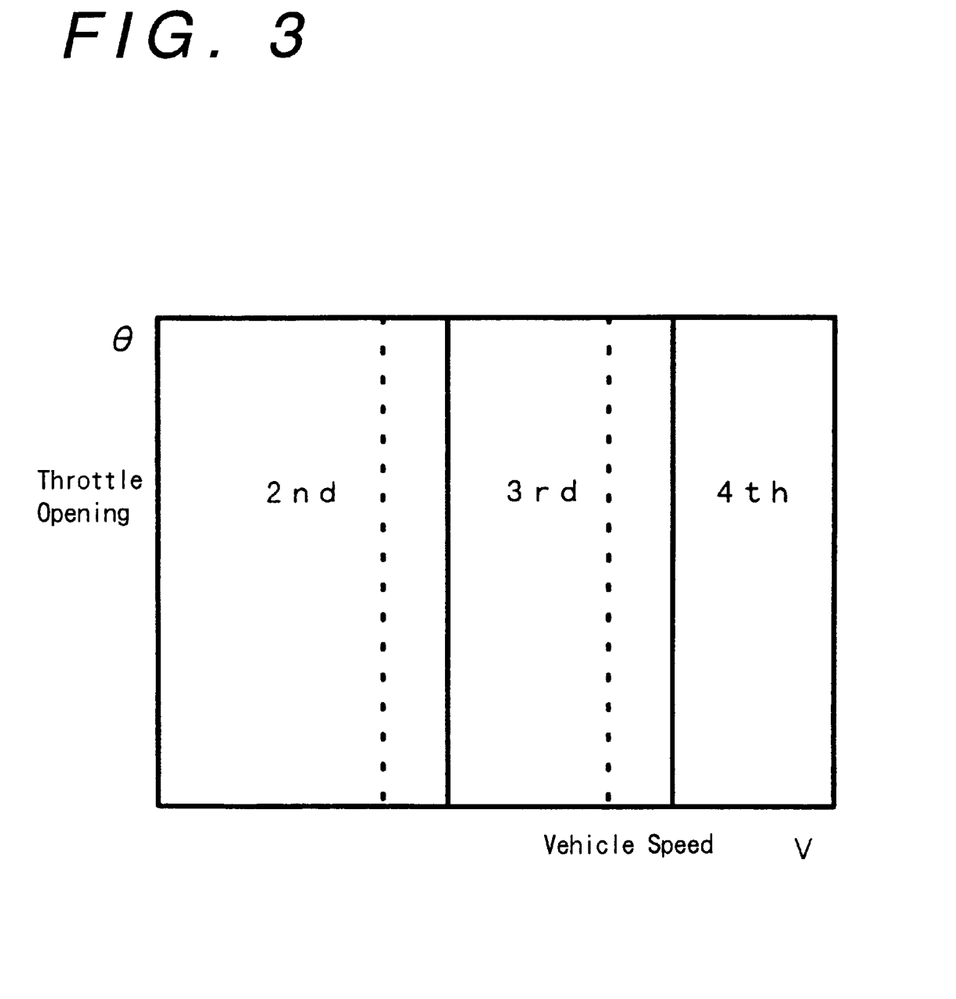
FIG. 3 is a map for controlling shifts between transmission stages.

Such control for determining an upper limit for transmission stages is performed based on a map such as shown in FIG. 3. The map for regulating transmission stages is set to allow an optimum transmission stage to be selected for acceleration, relative to the vehicle speed. The contents of the map may be changed based on factors such as the gradient of the road, the vehicle type, the vehicle weight, the type of the intersection or crossing, the number of lanes or roads joining at the intersection or crossing, and whether the vehicle is to turn to the left or right. For example, in the case of an uphill road, the map may be changed such that the regulation relatively quickly provides shift to a lower speed stage.

The controller 5 confirms the position of the vehicle and, as the vehicle approaches a section of road ("interval") for which control is to be performed, it responds to transition from an ON state (engaged) to an OFF state (released) of the accelerator by defining an upper limit for transmission stages based on the vehicle speed V at that time, utilizing the above-described map for regulating transmission stages. At this point, if the transmission stage at the upper limit thus defined is lower than the transmission stage which is actually in operation, a shift to a lower speed stage takes place and engine braking is provided. In this case, the intention to decelerate has already been confirmed from the operation of the accelerator and, accordingly, the shift to a lower speed will cause little driving discomfort.

However, when the vehicle approaches a stretch of road for which shift control is to be provided ("interval") with the accelerator in the OFF state, the OFF state of the accelerator does not necessarily represent an intention to decelerate. Accordingly, the intention to decelerate must be confirmed from other operations. For example, the control to regulate the upper limit for transmission stages may be commenced based on depression of the foot brake or turning ON a blinker.

Figure 2:
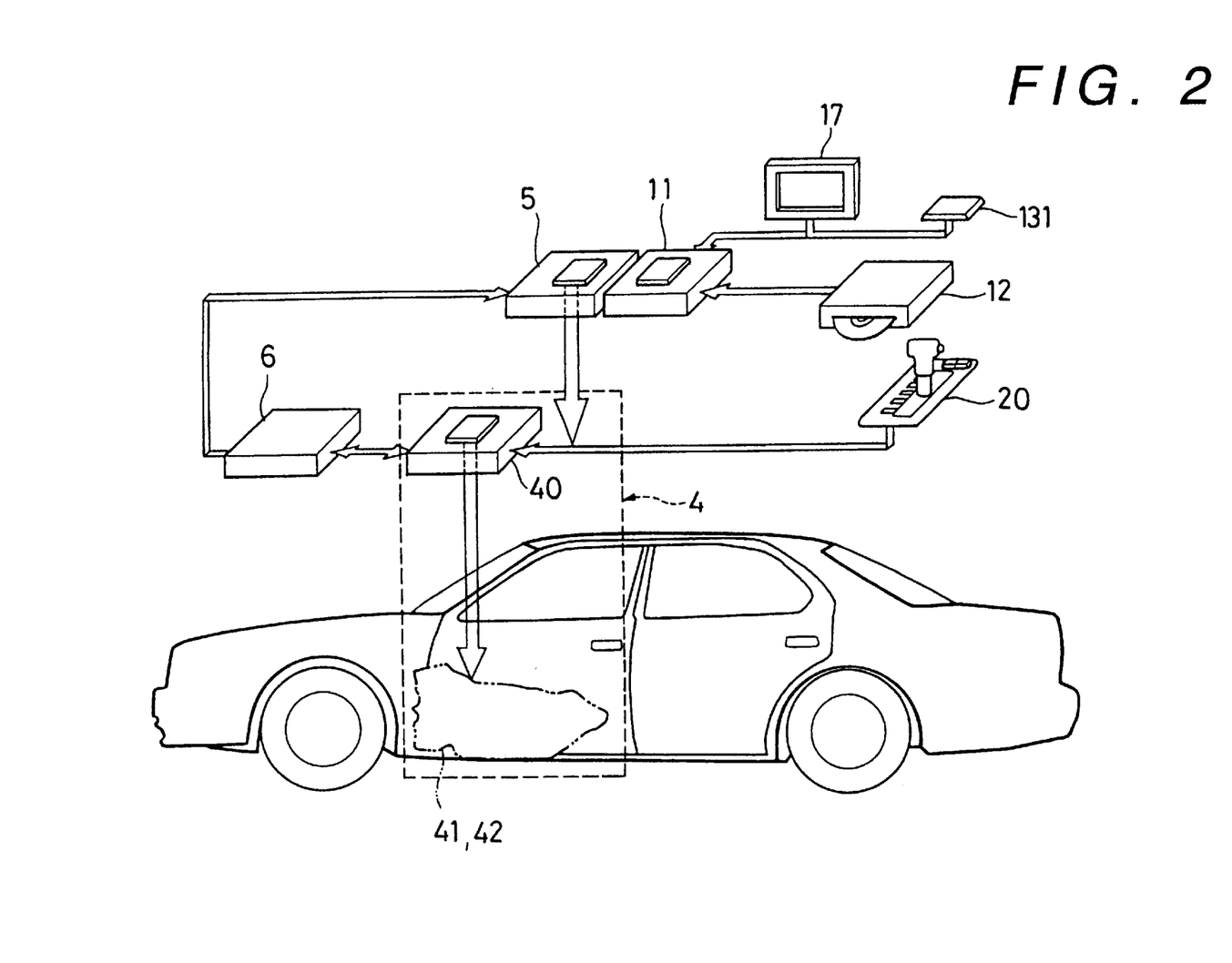
FIG. 2 is a schematic diagram of installation of the vehicle transmission controller of FIG. 1.

As shown in FIG. 2, the automatic transmission unit 4 includes an automatic transmission 41 (a multi-stage transmission having five transmission stages in the present embodiment), an actuator 42 for setting transmission gear ratios (a hydraulic control circuit for effecting shifts between five transmission stages in the present embodiment), and a transmission controller 40 for outputting an actuation signal to the actuator 42. The transmission controller 40 receives the input of the vehicle speed signal, the accelerator opening signal from the accelerator sensor, and the throttle opening signal from the throttle sensor. Communication is provided between the transmission controller 40 and the engine controller 6 as required.

The transmission controller 40 constitutes a transmission gear ratio setting means and determines the specific transmission stage to be selected using, for example, a data table (transmission stage map) for determining the transmission stage based on the throttle opening and the vehicle speed. A normal mode, a power mode, a hill mode, and the like are prepared for the transmission stage map and may be switched at the driver's will or through some control automatically responsive to road conditions.

Further, when a transmission stage regulating signal is input from the controller 5, control is provided for the transmission stages within the regulated range. For example, even when the transmission controller 40 has decided to use a fifth gear speed, a command signal supplied to a transmission actuator 42 is output only for first to fourth gear speeds if the controller 40 has set the fourth gear speed as the upper limit. A command signal determined within such a range will be output to the actuator 42 for setting the transmission gear ratio.

Figure 4:
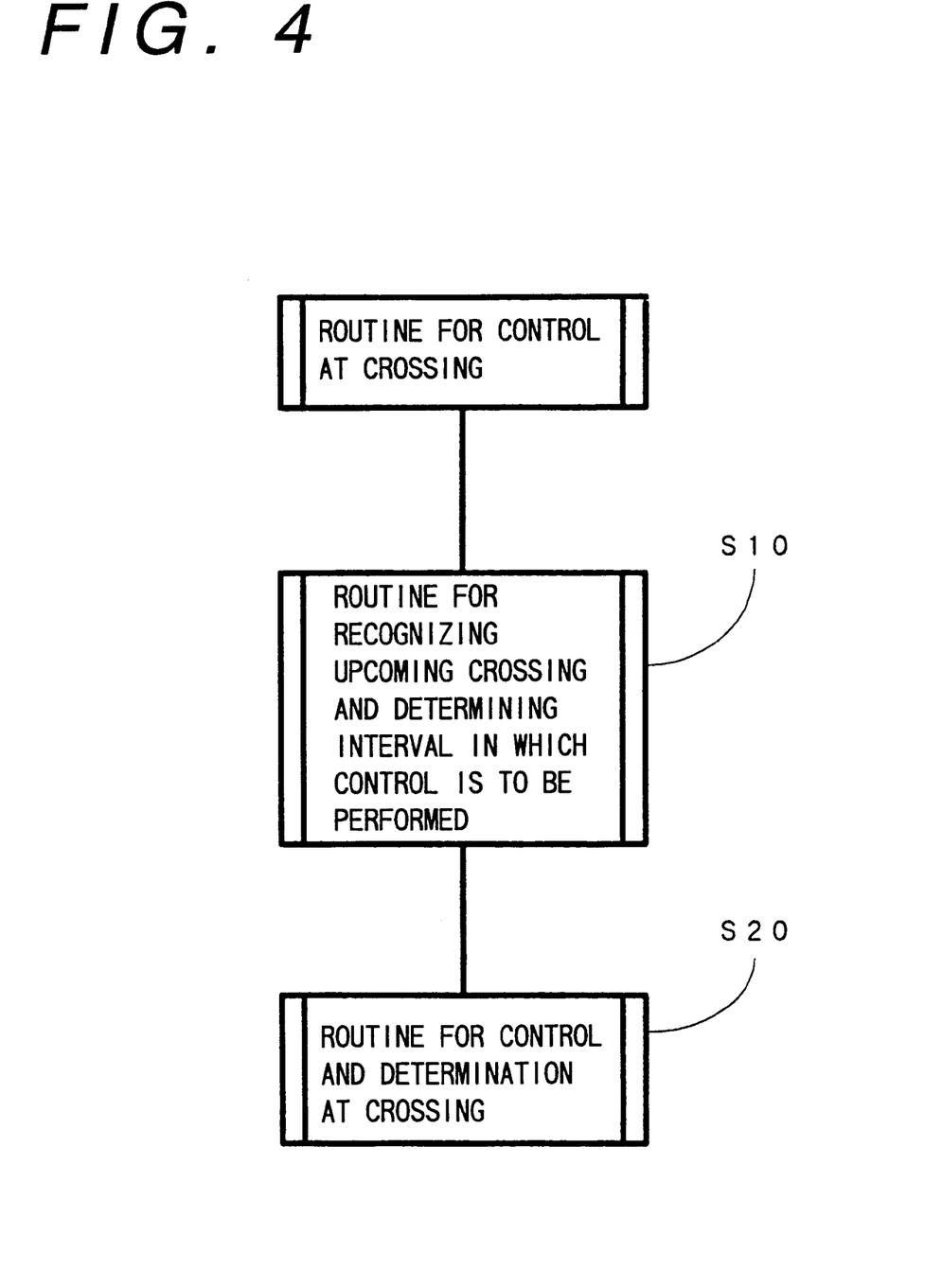
FIG. 4 is a routine for control at an intersection.
Figure 5:
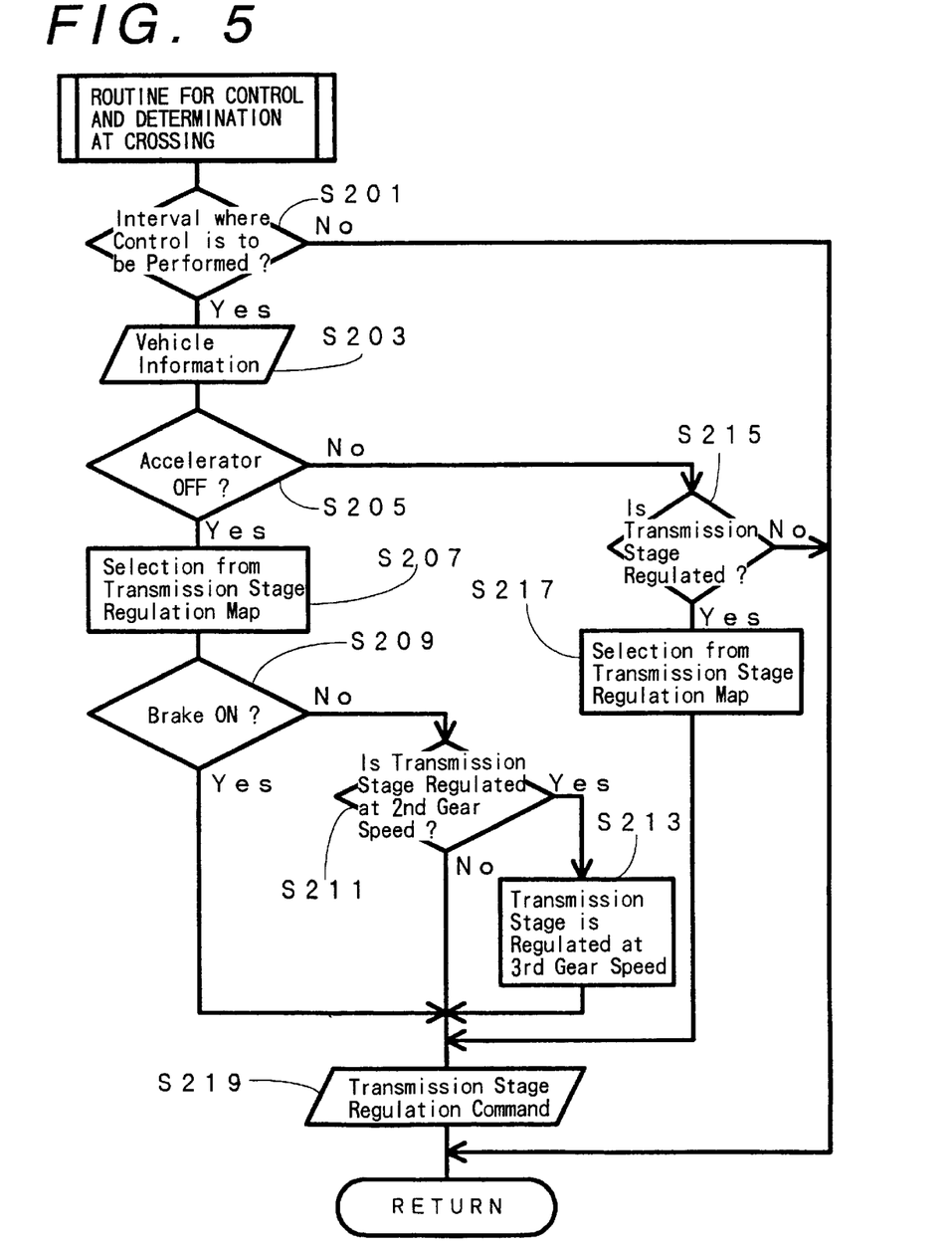
FIG. 5 is a subroutine for control at an intersection executed as step S20 in the routine of FIG. 4.

Operation of the controller during passage through an intersection will now be described with reference to the flow charts shown in FIGS. 4 and 5.

First, the position of the vehicle is detected by the current position detecting unit 13 and the upcoming intersection, crossing or other road feature identified by a shift reference point or node P (FIG. 6), is confirmed from the vehicle position. Then, a distance interval e for which control is to be performed is set to extend between positions before and beyond the reference point P, which positions are spaced apart from the reference point by predetermined distances in the traveling direction (step S10). After the distance interval (road section) e for which control is to be provided is set, control for the distance interval (FIG. 5) is commenced (step S20).

Control is started responsive to a determination that the vehicle has entered the stretch of road (distance interval e) for which control is to be performed by detecting the vehicle position (step S201). If the vehicle is not in the interval e (answer at step S201 is NO), the process returns to the main routine. If the vehicle is in the interval e (the answer at step S201 is YES), vehicle information is acquired (step S203). The vehicle information includes the current transmission stage, vehicle speed V, whether the accelerator is in the ON state or in the OFF state, and whether the brake is in the ON state or in the OFF state.

Next, it is determined whether or not the accelerator is in the OFF state (step S205). If the accelerator is ON (the answer at step S205 is NO), the process proceeds to step S215.

If the accelerator is OFF (the answer at step S205 is YES), an upper limit for the transmission stages is determined based on the vehicle speed V and the map for regulating the transmission stages shown in FIG. 3 (step S207).

Next, it is determined whether or not the brake is ON (step S209). If the brake is ON (the answer at step S209 is YES), it is confirmed that the driver has a definite intention to decelerate, which intention is only provisionally indicated by a determination that the accelerator is OFF. In this case, the upper limit for the transmission stages determined at step S207 is decided as a transmission stage command value as is.

If the brake is not ON (the answer at step S209 is NO), since it is not sufficiently determined that the driver has an intention to decelerate, a determination is made as to whether or not the regulation of the transmission stages determined at step S207 specifies the second gear speed (step S211). This provision is made in consideration of the magnitude of shocks that occur at speed changes and disorder in operation of the vehicle if the transmission stage were to be regulated to the second gear speed without confirmation of the intention of the driver.

If not at the second gear speed (the answer at step S211 is NO), the upper limit for the transmission stages determined at step S207 is used as the command value as is. Further, in this case, the vehicle may coast through the crossing by inertia even with the accelerator in the OFF state.

If the speed is regulated in the second gear stage (the answer at step S211 is YES), the upper limit for the transmission stages is changed to the third gear speed (step S213). Then, the transmission stage at the upper limit determined at steps S207 and S213 is output to the transmission controller 40 (step S219), and the process returns to the main routine.

Meanwhile, if it is determined at step S205 that the accelerator is ON, a determination is made as to whether or not steps S207 through S213 have already been performed in the interval e (step S215). If yes, (the answer at step S215 is YES), it means that deceleration for passing through the intersection has already been completed and that the driver may accelerate the vehicle. Therefore, an upper limit for the transmission stages is determined based on the vehicle speed V and the map for regulating the transmission stages in FIG. 3 (step S217).

The transmission stage at the upper limit determined at step S217 is output to the transmission controller (step S219), and the process returns to the main routine.

If the steps S207 through S213 have not been performed (the answer at step S215 is NO), the process returns to the main routine. This means that the vehicle has passed through the intersection with the accelerator depressed and that the deceleration and acceleration have not been performed as a series of operations.

The transmission controller 40 selects a transmission stage based on the vehicle speed V and a normal map for the transmission stages, compares the transmission stage with the transmission stage at the upper limit commanded at step S219, and selects the transmission stage of the lowest speed. Then, it outputs a command signal to the actuator 42 so that the finally selected transmission stage is set. As a result of such control, a shift to a lower speed takes place depending on the vehicle speed if the finally selected transmission stage is lower that the current transmission stage in operation. This makes it possible to conform driving force to the intention of the driver and to exit the intersection smoothly.

The control operation as described above may be performed by either the transmission controller 40 or the navigation processing unit 11 and, alternatively, a configuration may be employed in which each of the controller 5, transmission controller 40, and navigation processing unit 11 is responsible for a part of such control.

The control over transmission stages as described above results in operation of the vehicle as illustrated in FIG. 6. As shown in FIG. 6, a vehicle approaching an interval "e" (length or "stretch" of road) in which control to be performed is decelerated as a result of a shift to a lower speed responsive to turning OFF (release of) the accelerator. At this point, an optimum transmission stage for the next acceleration is set in accordance with the travel speed of the vehicle. As a result, when the accelerator is turned ON (depressed) as the vehicle leaves the intersection, acceleration is started immediately because the optimum transmission stage for the acceleration has already been set. This allows smooth acceleration as intended by the driver.

The transmission controller may decide a transmission stage based on the throttle opening and vehicle speed or based on the accelerator position and vehicle speed. Alternatively, a configuration may be employed in which a transmission stage is decided based on the magnitude of the engine torque and the vehicle speed.

The map shown in FIG. 3 includes an area of hysteresis for preventing hunting. The boundaries in solid lines are used when the vehicle speed V is increased, and the boundaries in dotted lines are used when the vehicle speed is decreased.

An automatic transmission device including a non-stage (continuously variable) transmission may be used and, in this case, the transmission gear ratio regulating means regulates the range of transmission gear ratios instead of transmission stages.

As described above, when deceleration occurs in approaching an interval in which control is to be performed, a vehicle controller according to the present invention sets an optimum transmission stage for acceleration in advance by predicting the next acceleration. This allows smooth and highly responsive control over transmission gear ratios consistent with the intention of the driver.

Especially, the reliability of the control operation can be further ensured by deciding the commencement of control after confirming the driver's intent to decelerate from operation of the accelerator, brake or blinker.

In addition, since unnecessary shifting between transmission stages is eliminated, it is possible to reduce the load on the transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A vehicle transmission controller comprising:
   road information acquisition means for acquiring road information including information regarding road features requiring a change in gear ratio of the transmission for traverse by the vehicle, information regarding a reference point for each of said road features and information for gear ratios predetermined for each of said road features and correlated with vehicle speed;
   vehicle position detecting means for detecting the position of the vehicle on a road having said road features;
   vehicle speed detecting means for detecting the speed of the vehicle;
   control interval setting means for setting a length of said road, inclusive of one of said reference points, as a control interval for which transmission control is to be provided in traversing the road feature associated with said reference point;
   an automatic transmission mechanism for automatically changing the transmission gear ratio responsive to command signals;
   transmission gear ratio regulating means for setting an upper limit for the transmission gear ratio during said control interval;

driving operation detecting means for detecting an operation the driver indicative of an intent to change travel speed of the vehicle; and transmission gear ratio setting means for generating the command signals in accordance with said gear ratios predetermined for said road feature associated with said one reference point, with the detected vehicle speed and with said upper limit, responsive to (1) a determination that the detected vehicle position is within a predetermined distance of said one reference point and (2) detection of said operation.

2. A vehicle transmission controller according to claim 1, wherein the operation detected by said driving operation detecting means is any one of operation of an accelerator, operation of a foot brake, and operation of a blinker.

3. A vehicle transmission controller according to claim 2, wherein said automatic transmission mechanism is a transmission having multiple speed stages and said automatic transmission mechanism changes the transmission gear ratio by shifting between the multiple speed stages.

4. A vehicle transmission controller according to claim 2, wherein said automatic transmission mechanism is a non-stage transmission.

5. A vehicle transmission controller according to claim 1, wherein said automatic transmission mechanism is a transmission having multiple speed stages and said automatic transmission mechanism changes the transmission gear ratio by shifting between the multiple speed stages.

6. A vehicle transmission controller according to claim 1, wherein said automatic transmission mechanism is a non-stage transmission.

7. A vehicle transmission controller according to claim 1 further comprising a memory storing a map of said predetermined gear ratios correlated with vehicle speed.

8. A vehicle transmission controller comprising:

road information acquisition means for acquiring road information including information regarding road features requiring a change in gear ratio of the transmission for traverse by the vehicle, information regarding a reference point for each of said features and information for gear ratios predetermined for each of said road features and correlated with vehicle speed;

vehicle position detecting means for detecting the position of the vehicle on a road having said road features;

vehicle speed detecting means for detecting the speed of the vehicle;

control interval setting means for setting a length of said road, extending a predetermined length before said reference point and a predetermined length beyond said reference point, as a control interval for which transmission control is to be provided in traversing the road feature associated with said reference point;

an automatic transmission mechanism for automatically changing the transmission gear ratio responsive to command signals;

transmission gear ratio regulating means for setting an upper limit for the transmission gear ratio during said control interval;

driving operation detecting means for detecting an operation of the driver indicative of an intent to change travel speed of the vehicle by detecting at least one of OFF state of an accelerator and ON state of a foot brake; and transmission gear ratio setting means for generating the command signals in accordance with said gear ratios predetermined for said road feature associated with said one reference point, with the detected vehicle speed and with said upper limit, responsive to (1) a determination that the detected vehicle position is within a predetermined distance of said one reference point and (2) detection of said operation.

* * * * *